(12) United States Patent
Wissenbach

(10) Patent No.: US 7,231,662 B2
(45) Date of Patent: Jun. 12, 2007

(54) AUTOMATED SECURITY TOOL FOR STORAGE SYSTEM

(75) Inventor: Jens Wissenbach, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 10/446,769

(22) Filed: May 28, 2003

(65) Prior Publication Data

US 2004/0243772 A1    Dec. 2, 2004

(51) Int. Cl.
*G06F 17/30* (2006.01)
(52) U.S. Cl. ............................. 726/4; 713/182; 707/200
(58) Field of Classification Search .................. 726/4; 707/100, 104.1, 200, 203, 205; 705/51; 713/155, 713/165–167, 182
See application file for complete search history.

(56) References Cited

U.S. PATENT DOCUMENTS

| | | | |
|---|---|---|---|
| 5,797,030 A | 8/1998 | Hoaby | |
| 6,044,155 A | 3/2000 | Thomlinson | |
| 6,088,799 A | 7/2000 | Morgan | |
| 6,182,222 B1 | 1/2001 | Oparaji | |
| 6,272,631 B1 | 8/2001 | Thomlinson | |
| 6,275,933 B1 * | 8/2001 | Fine et al. ...................... | 713/2 |
| 7,016,877 B1 * | 3/2006 | Steele et al. ................... | 705/50 |
| 2002/0023059 A1 | 2/2002 | Bari | |
| 2002/0046188 A1 | 4/2002 | Burges | |
| 2002/0087545 A1 | 7/2002 | Bright | |
| 2002/0095602 A1 | 7/2002 | Pherson | |
| 2003/0154206 A1 * | 8/2003 | Kanai .......................... | 707/100 |

FOREIGN PATENT DOCUMENTS

JP          11-250012          9/1999

* cited by examiner

*Primary Examiner*—T. B. Truong
(74) *Attorney, Agent, or Firm*—Dan Shifrin

(57) ABSTRACT

A data storage manager is provided attached to a data processing network having at least one host device and at least one storage volume. System resources are allocated among a plurality of storage tiers, each tier having at least one partition. At least one host device and at least one storage volume are associated with each partition and at least one application is associated with each partition of the lowest level storage tier. The storage manager also includes a user profile table which identifies various users along with a log-on code, at least authorized one IP address range and at least one authorized command. The storage manager also includes a verification system responsive to a received log-on code and requested operation to restrict the user to authorized IP address range(s) and authorized commands.

29 Claims, 9 Drawing Sheets

StorageMaster

| Create Volume | Create StorageArea | Create StoragePool | Create StorageGroup |
|---|---|---|---|
| Set Volume | Delete StorageArea | Delete StoragePool | Delete StorageGroup |
| Set Port | | | |

StorageArea

| SuperUser Commands | Operator Commands | Monitor Commands |
|---|---|---|
| Create StoragePool | Create VolumeAccess | Who |
| Delete StoragePool | Delete VolumeAccess | WhoAmI |
| Create HostConnection | RsExecute Task | Send |
| Delete HostConnection | List Task | Refresh |
| Set HostConnection | List Server | Get AccessGroups |
| Clear Configuration | List Port | Get Commands |
| Clear CLIError | List Disk Group | Get CLIVersion |
| | List Volume | Get ELIError |
| | List VolumeSpace | Get Proxy |
| | List VolumeAccess | Get Resources |
| | List HostConnection | Get Server |
| | List PPRCPaths | Get Port |
| | List RsQuery | Get DiskGroup |
| | List ComponentConnection | Get Volume |
| | List ComponentAccess | Get VoumeSpace |
| | | Get VolumeAccess |
| | | Get HostConnection |
| | | Get PPRCPaths |
| | | Get RsQuery |
| | | Get Task |
| | | Get VolumeTask |
| | | Get PathEstTask |
| | | Get PathRmvTask |
| | | Get ComponentConnection |
| | | Get ComponentAccess |

FIG. 6

Storage Pool

| SuperUser Commands | Operator Commands | Monitor Commands |
|---|---|---|
| Create StorageGroup | Create VolumeAccess | Who |
| Delete StorageGroup | Delete VolumeAccess | WhoAmI |
| Create HostConnection | RsExecuteTask | Send |
| Delete HostConnection | List Volume | Refresh |
| Set HostConnection | List VolumeAccess | Get Proxy |
| | List HostConnection | Get Resources |
| | List RsQuery | Get AccessGroups |
| | List Task | Get Commands |
| | List ComponentConnection | Get CLIVersion |
| | List ComponentAccess | Get Volume |
| | | Get VolumeSpace |
| | | Get VolumeAccess |
| | | Get HostConnection |
| | | Get RsQuery |
| | | Get Task |
| | | Get VolumeTask |
| | | Get ComponentConnection |
| | | GetComponentAccess |

FIG. 7

StorageGroup

| SuperUser Commands | Operator Commands | Monitor Commands |
|---|---|---|
| Create HostConnection | Create VolumeAccess | Who |
| Delete HostConnection | Delete VolumeAccess | WhoAmI |
| Set HostConnection | RsExecuteTask | Send |
| | List Volume | Refresh |
| | List VolumeAccess | Get Proxy |
| | List HostConnection | Get Resources |
| | List RsQuery | Get AccessGroups |
| | List Task | Get Commands |
| | List ComponentConnection | Get CLIVersion |
| | List ComponentAccess | Get Volume |
| | | Get VolumeSpace |
| | | Get VolumeAccess |
| | | Get HostConnection |
| | | Get RsQuery |
| | | Get Task |
| | | Get VolumeTask |
| | | Get ComponentConnection |
| | | GetComponentAccess |

FIG. 8

AUTOMATED SECURITY TOOL FOR STORAGE SYSTEM

TECHNICAL FIELD

The present invention relates generally to the field of enterprise storage systems and, in particular, to providing a centralized security tool for managing access to storage volumes.

BACKGROUND ART

Security for data processing systems is a continuing significant issue. Financial, legal, medical and governmental transactions, to name only a few, are conducted using computer databases and it is imperative that the data, most of which is confidential, be protected. While much effort has been made to protect against breaches from the outside, attention must also be paid to internal security. In particular, within an organization, most personnel only require access to only limited portions of the stored data.

A storage system may include one or more storage servers, such as the International Business Machines (IBM) Enterprise Storage Server® (ESS) Model 800, to which are attached one or more host devices (FIG. 1). The ESS 800 is sufficiently versatile as to be simultaneously attachable to a variety of different host devices utilizing a variety of operating systems. The host devices may include such servers as the IBM AS/400®, the IBM RS/6000® and the IBM S/390® utilizing such operating systems as UNIX®, Windows NT®, Novel® NetWare, among others. Further, the host devices may attach to the storage server through such interfaces as SCSI, ESCON®, FICON™ and Fiber Channel. The ESS 800 server includes two clusters, each having a RISC processor, cache memory and a RAID disk array, as well as appropriate host and network adapters.

Heretofore, system security included a user ID and an associated password. Each storage server kept a separate user database and users can generally execute any commands and access any IP address. Thus, the present system does not provide means for limiting a user's access to a defined set of IP address ranges or limiting the user to executing a defined set of commands. As a consequence, the present system does not provide means for grouping storage server resources around user IDs and exposes each user to all resources, not just those to which the user needs access.

SUMMARY OF THE INVENTION

The present invention provides a data storage manager attached to a data processing network having at least one host device and at least one storage volume. System resources are allocated among a plurality of storage tiers, each tier having at least one partition. In one embodiment, there are three tiers, a top tier (of storage areas), a middle tier (of storage pools) and a bottom tier (of storage groups). At least one host device and at least one storage volume are associated with each partition and at least one application is associated with each partition of the lowest level storage tier. The storage manager further includes a resource allocation table, in which host devices and storage volumes are allocated among the partitions, an application table, in which the applications are associated with the partitions of the lowest level storage tier, and a user profile table.

The user profile table identifies various users, including a Storage Master, a Super User for each tier and at least one Operator for each partition. The user profile table further identifies user profile information for each user. The user profile information includes for each user: a log-on code, at least one IP address range which the user is authorized to access, and at least one authorized command selected from a list of available commands.

The storage manager further includes a user interface for receiving a log-on code and a requested operation input by a user and a verification system responsive to the received log-on code and requested operation. The verification system restricts the user to the authorized IP address range(s) and restricts the user to authorized commands.

The commands for the Super User of one tier may be different from the commands authorized for the Super User of a higher or lower tier. Similarly, the commands for the Operators of one tier may be different from the commands authorized for the Operators of a higher or lower tier.

BRIEF DESCRIPTION OF THE DRAWINGS

FIG. 6 is a block diagram illustrating exemplary commands which might be available to the Storage Master and to storage area users using the security tool of the present invention;

FIG. 7 is a block diagram illustrating exemplary commands which might be available to storage pool users using the security tool of the present invention; and FIG. 8 is a block diagram illustrating exemplary commands which might be available to storage group users using the security tool of the present invention.

DETAILED DESCRIPTION OF THE PREFERRED EMBODIMENT

Figure 1:
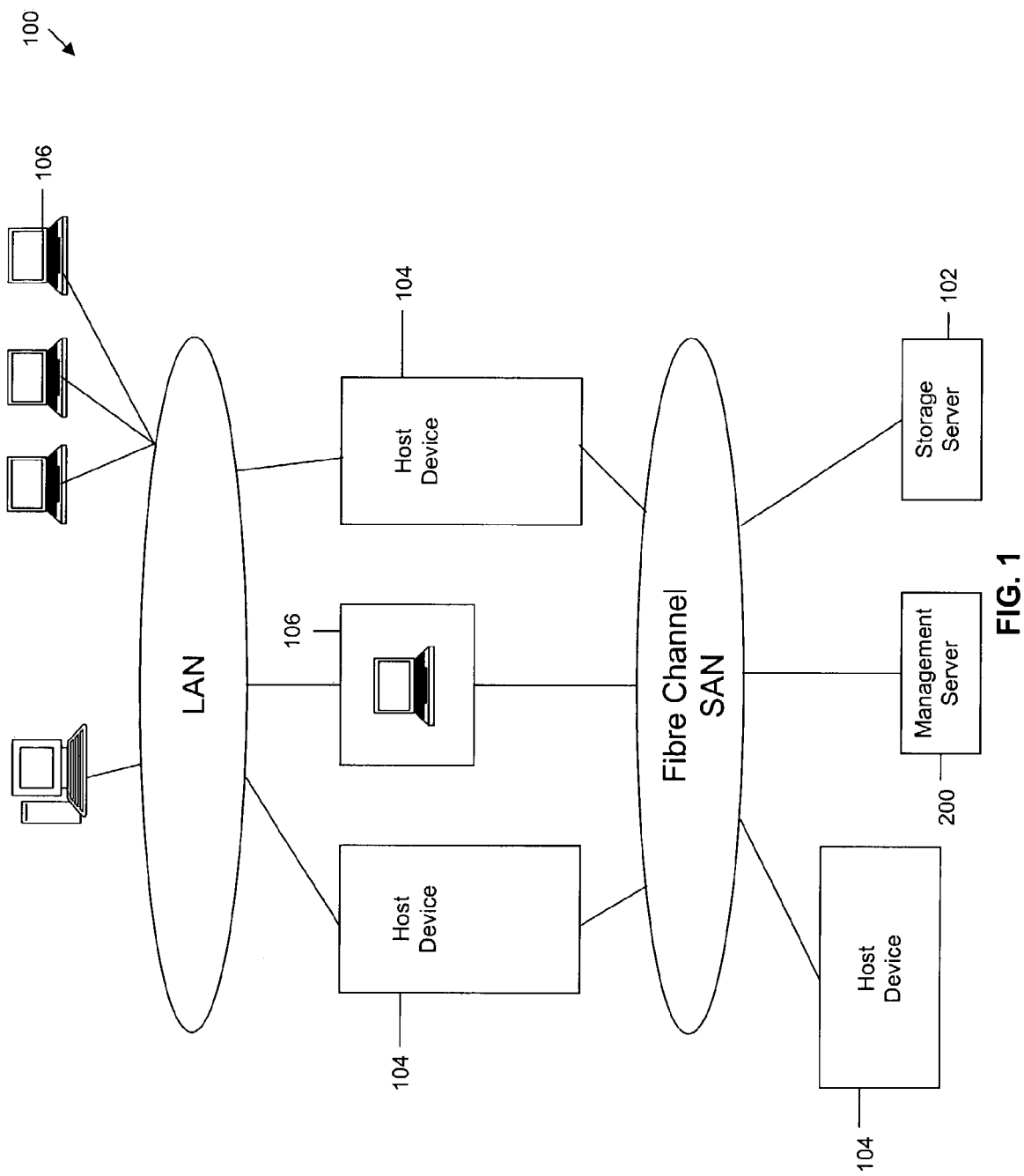
FIG. 1 is a block diagram of an exemplary storage system, including a management server of the present invention.
Figure 2:
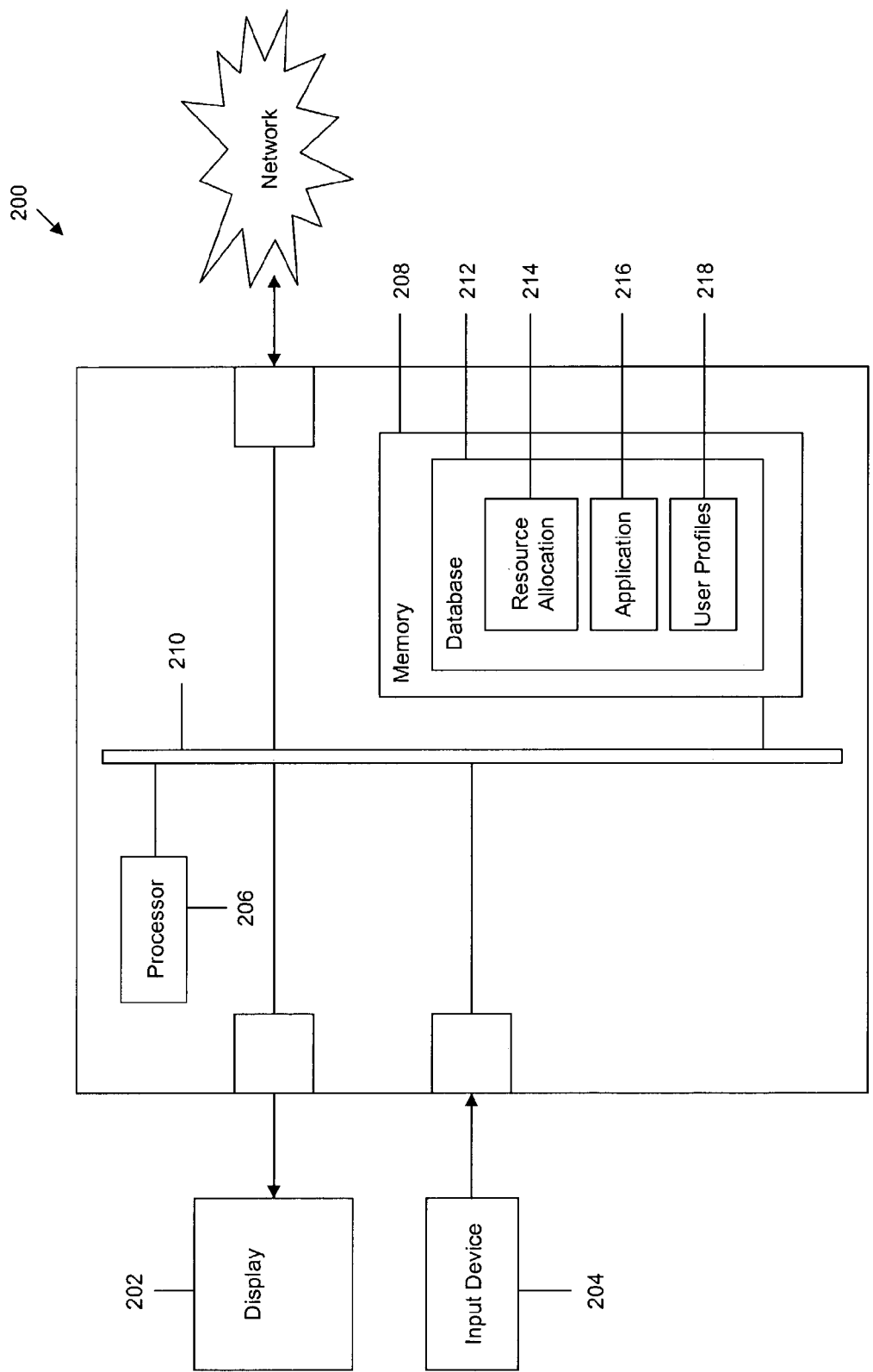
FIG. 2 is a block diagram of a management server in which the security tool of the present invention may be implemented.

FIG. 1 is a block diagram of an exemplary storage system 100, including a management server of the present invention. The storage system 100 includes one or more storage servers 102, such as an ESS 800, as well as various host devices 104 and user consoles 106. The host devices 104 are not restricted to any one type and are not restricted to running any single operating system. Storage devices within the storage server(s) 102 are divided into logical storage volumes having logical addresses which are mapped into physical storage addresses. The storage system 100 further includes a management server 200. Due to the capabilities of the system 100, any of the user consoles 106 may serve as a console for the management server 200. However, for security purposes, a dedicated management server may be desirable. The components of the storage system 100 need not be installed in a single location but may be geographically separated to the extent that the network connections permit.

The management server 200 includes a display 202 and a user input device 204, such as a keyboard and mouse, a processing unit 206 for executing application programs stored in a memory 208. The memory 208 may comprise a non-volatile hard disk, a removable magnetic disk or optical disc, random access memory (RAM), read only memory (ROM), flash memory, or any combination of these and/or other types of memory. The components are interconnected, such as through a bus 210.

A database 212 residing in the server 200, such as in the memory 208, or accessible to the server 200 contains records indicating how the host devices 104 and storage volumes are allocated and identifying authorized users. For purposes of this description, reference will be made to a single database 212 and to tables within the database 212. However, it will be appreciated that information may be contained in more than one database and that the records may be stored in any of a number of appropriate formats. Thus, the configuration and format of the information referred to herein is meant to be an example and is not to be a limitation on the scope of the invention.

As will be detailed more thoroughly below, the host devices 104 and storage volumes (hereinafter referred to as the "system") are allocated among any number of tiers. For purposes of this description, reference will be made to three tiers. The highest tier is partitioned into one or more storage "areas"; the middle tier is partitioned into one or more storage "pools"; and the lowest tier is partitioned into one or more storage "groups". Information about the partition configuration and the allocation of host devices and storage volumes to the various partitions is stored in a resource allocation table 214 in the database 212. Applications are associated with each partition in the lowest tier (i.e., with each of the storage groups) and this information is stored in an application table 216 in the database 212. The database 212 also includes a user profile table 218 identifying authorized users and their log-on codes (such as user names and passwords), authorized IP address ranges and authorized commands.

In operation, a person designated as a Storage Master logs onto the management server 200 through a console and organizes the host devices 104 and storage volumes of the system 100 into tiers having independent access restrictions. In one embodiment, FIG. 3, the host devices 104 and storage volumes are organized into three tiers. The system 300 (comprising all of the host devices and all of the storage volumes) is divided by the Storage Master into one or more "storage areas" 302 and 310. The Storage Master allocates the host devices and storage volumes among the storage areas and further designates a Storage Area Super User to supervise the storage areas 302 and 310.

The Storage Area Super User (or the Storage Master) may divide each storage area into one or more "storage pools". For example, the storage area 310 is divided into three storage pools, 312, 314 and 320. The host devices and storage volumes allocated to the storage area 310 are then allocated by the Storage Area Super User among the storage pools 312, 314 and 320. The Storage Area Super User may further designate a Storage Pool Super User to supervise the storage pools 312, 314 and 320.

The Storage Pool Super User (or the Storage Master or Storage Area Super User) may divide each storage pool into one or more "storage groups". For example, the storage pool 320 is divided into two storage groups 322 and 324. The host devices and storage volumes allocated to the storage pool 320 are allocated by the Storage Pool Super User between the storage groups 322 and 324. The Storage Pool Super User may further designate a Storage Group Super User to supervise the storage groups 322 and 324.

The Storage Group Super User (or the Storage Master, Storage Area Super User or Storage Pool Super User) may allocate the host devices and storage volumes allocated to the storage pool 320 between the storage groups 322 and 324. The Storage Group Super User (or the Storage Master, Storage Area Super User or Storage Pool Super User) also determines which applications are to be associated with which storage group.

Figure 3:
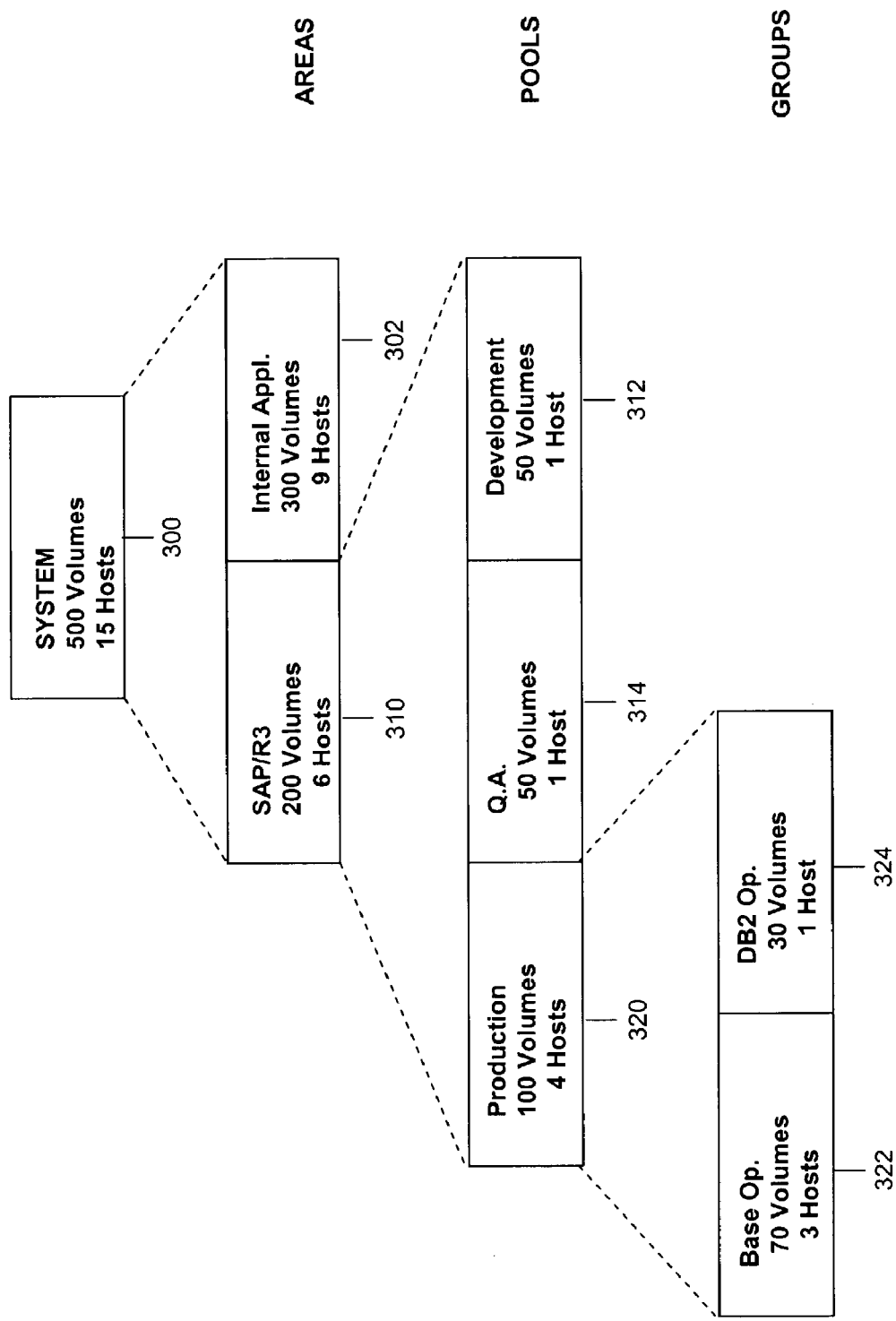
FIG. 3 is a representation of one exemplary allocation of system resources among storage areas, storage pools and storage groups according to the present invention.

More specifically, the Storage Master of the system 300 represented in FIG. 3 has divided the system 300 into two storage areas 302 and 310. One storage area 310 is dedicated to SAP™ R/3™ applications and has been allocated 200 of the 500 storage volumes and six of the fifteen host devices while the other storage area 302 is dedicated to other applications and allocated the remaining 300 storage volumes and nine hosts.

Next, the Storage Area Super User has divided one of the storage areas 310 into three storage pools 312, 314 and 320. One storage pool 312 is dedicated to development and has been allocated 50 of the 200 volumes and one of the six host devices. The second storage pool 314 is dedicated to quality assurance and has also been allocated 50 volumes and one host device. The third storage pool 320 is dedicated to production and has been allocated the remaining 100 volumes and four host devices.

Finally, the Storage Pool Super User has divided one of the storage pools 320 into two storage groups 322 and 324. One storage group 322 is dedicated to base operations and has been allocated 70 of the 100 storage volumes and three of the four host devices. The other storage group 324 is dedicated to DB2® operations and has been allocated the remaining 30 storage volumes and one host device.

Each Super User may designate other users to have different levels of access to different parts of the system. One such level of use is that of Operator, for those who require limited access rights, and another is that of Monitor, for those who require only the right to monitor various aspects of the system, without needing to execute any read or write commands.

Figure 4:
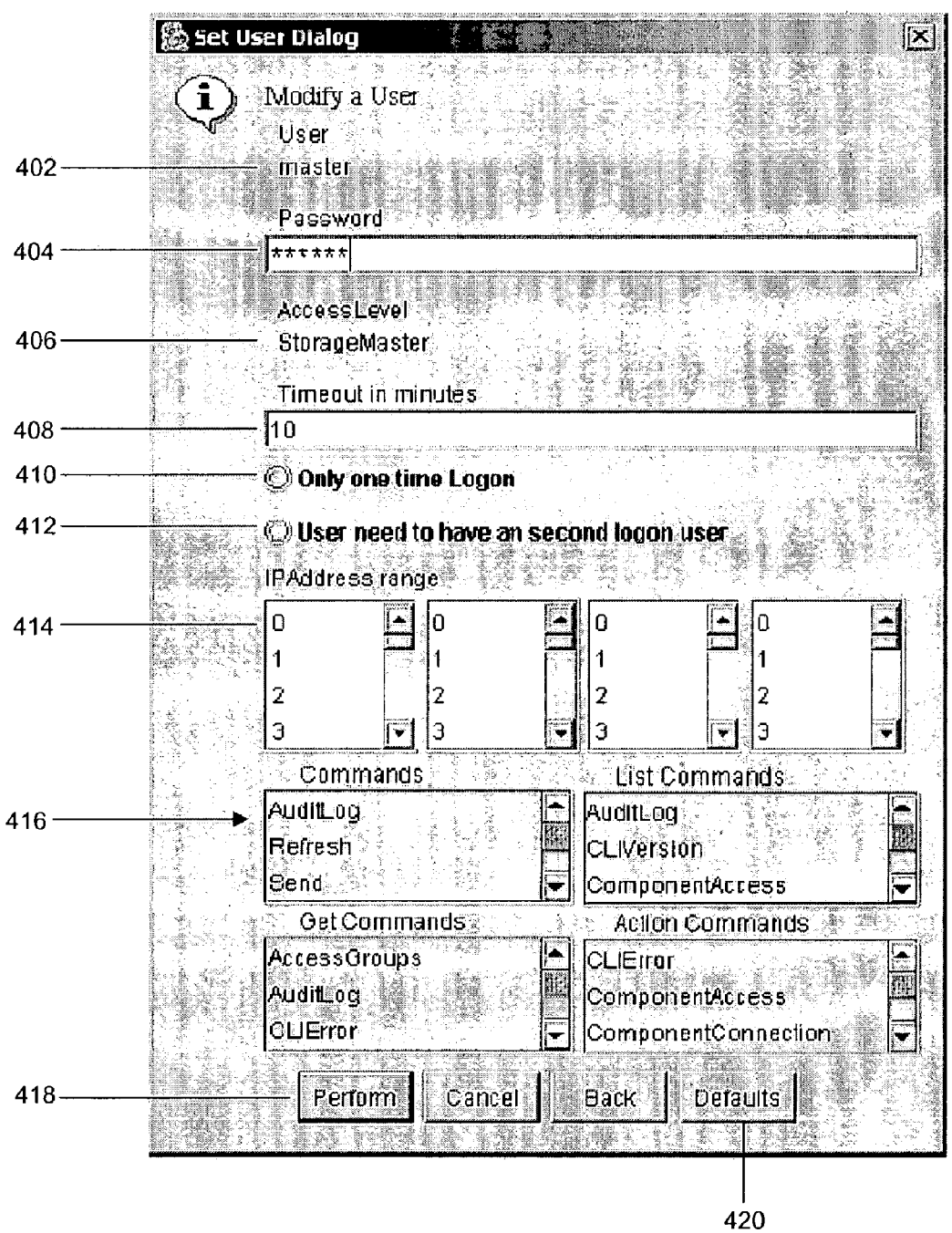
FIG. 4 is an exemplary input dialog through which a Storage Master or Super User inputs user profile data into the security tool of the present invention.

In addition to establishing the storage areas, storage pools, storage groups, the respective Super Users may establish user profiles for Operators and Monitors in the areas, pools and groups. The Storage Master, by virtue of having full supervisory rights, may also establish profiles for any user, including those of the Super Users. FIG. 4 is an exemplary screen shot of an input dialog on the display 202 of the management server 200 to be used to establish a user profile. After logging onto the management server 200, the user (in FIG. 4, the Storage Master) selects a user whose profile is to be established or modified. In FIG. 4, the user name of the Storage Area Super User has been selected (402). The Storage Area Super User's password is input (404) and his or her access level is established (406); in the illustration, the access level is that of a Storage Area Super User.

Next, a timeout value is entered in the appropriate box 408 to indicate how long a user may be logged on without any activity before the system automatically logs off the user and requires him or her to log back on. This provides another level of security, preventing a user from leaving a console logged on, accidentally or otherwise, and not being present for a predetermined period of time. Additionally, a user may be permitted only a single logon, such as for a specific, one-time situation. An appropriate entry 410 is made to the user profile. Similarly, a user may be required to obtain a parallel logon by a second user, such as a supervisor, before access is granted. An appropriate entry 412 for a second user requirement is also made to the user profile.

In most cases, it may not be necessary for every user to have access to every area of the system. Consequently, entries 414 may be made to designate which IP address ranges each user may access. It will be appreciated that the form of entry for allowable IP address ranges may differ from that illustrated in FIG. 4. For example, ranges of exclusion may be entered rather than ranges of inclusion or specific address may be entered for inclusion or exclusion.

Similarly, it may not be necessary or desirable for every user to be able to request the system to execute every one of the numerous available commands. In an ESS system, such commands are grouped into several categories: general commands, list commands, get commands and action commands. Specific commands may, therefore, be selected 416 from each of the groups and allowed the user.

Once the user profile has been completed, the Storage Master saves 418 the profile for storage on the server 200. As an alternative to making a customized profile for each user, the system may be programmed with a default profile for each type of user. Then, the Storage Master, or whomever is establishing a profile, may easily select a default profile 420 for any particular user. The default profile may then be accepted and saved in whole or modified.

As previously stated, due to his or her status, the Storage Master has authority to establish or modify the profile of any user. A Storage Area Super User has authority to establish or modify the profile of any user of any area, pool or group, including the Storage Pool and Group Super Users, as well as area, pool and group Operators and Monitors. A Storage Pool Super User has authority to establish or modify the profile of any user of any pool or group, including the Storage Group Super Users, as well as pool and group Operators and Monitors. Finally, a Storage Group Super User has authority to establish or modify the profile of any user of any group, namely, group Operators and Monitors.

Figure 5A:
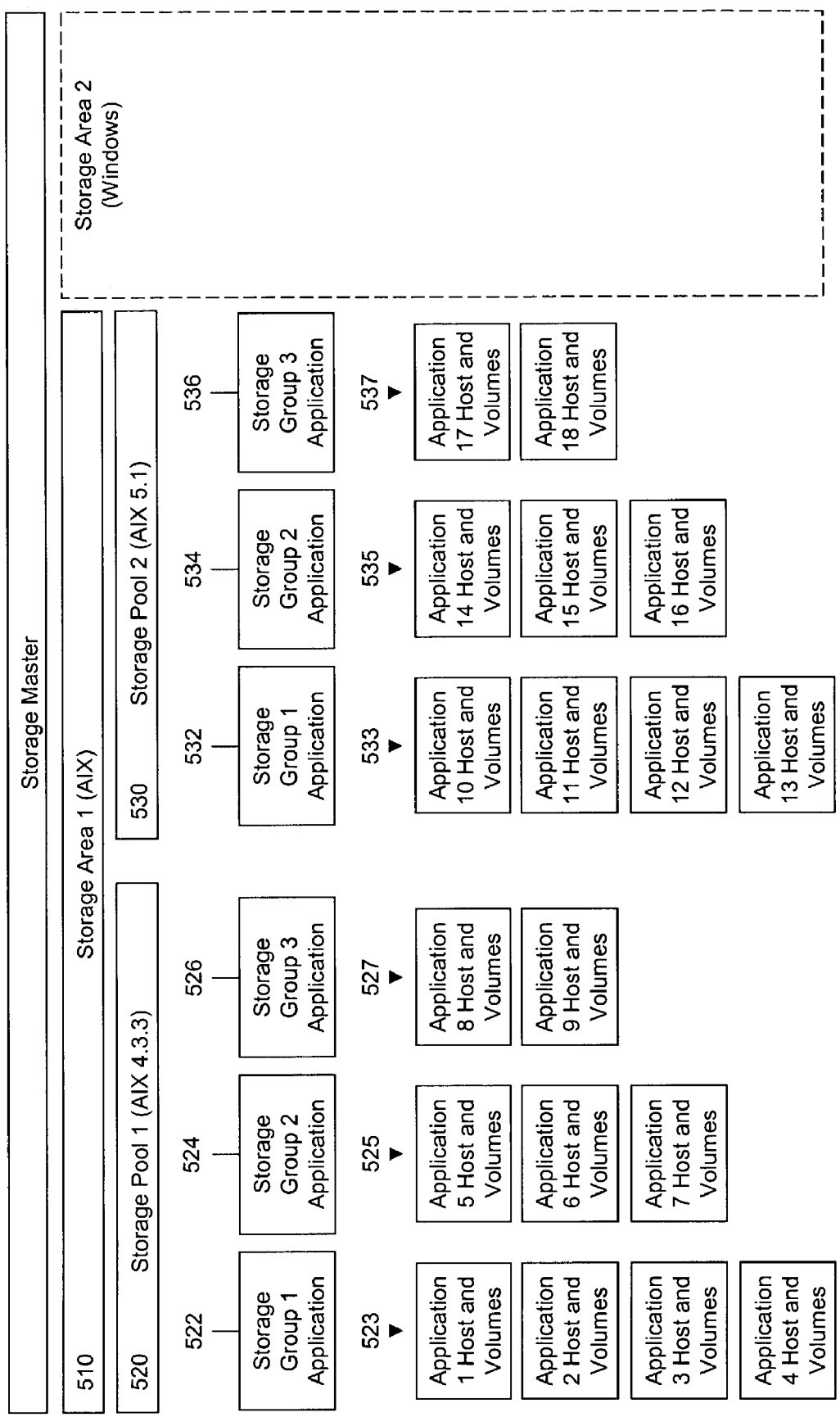
FIG. 5 is a representation of another exemplary allocation of system resources among storage areas, storage pools and storage groups according to the present invention.
Figure 5B:
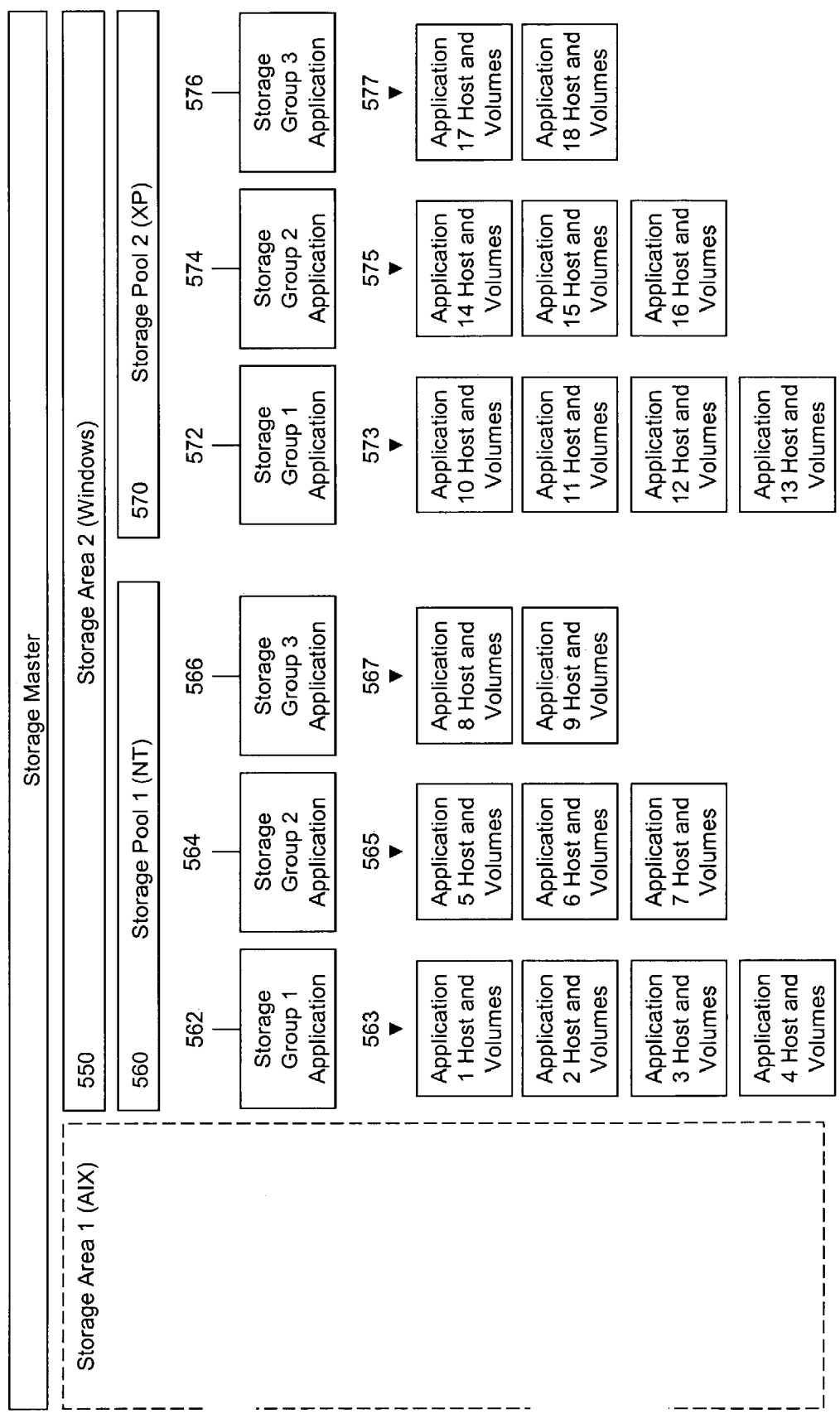

FIG. 5 is a representation of another exemplary allocation of system resources among storage areas, storage pools and storage groups. In this representation, the system has been divided into two storage areas based upon operating system: one area 510 for AIX® and one 550 for Windows™. The first storage area 510 is further divided into two storage pools, one 520 for AIX Version 4.3.3 and the other 530 for AIX Version 5.1. The first storage pool 520 is divided into three storage groups 522, 524 and 526, one for each of a different set of applications 523, 525 and 527. The second storage pool 530 is also divided into three storage groups 532, 534 and 536, one for each of a different set of applications 533, 535 and 537. The second storage area 550 is also further divided into two storage pools, one 560 for Windows NT® and the other 570 for Windows XP, each of which is divided into three storage groups 562, 564 and 566 and 572, 574 and 576, respectively, one for each of a different set of applications 563, 565 and 567 and 573, 575 and 577, respectively. As with the system illustrated in FIG. 3, host and volume resources are allocated among the areas, pools and groups as the Storage Master and Super Users decide.

As previously noted, not every user needs to, or should, be able to execute every command. For example, Monitors by definition should only have read authority. FIGS. 6–8 are block diagrams of the commands available to Super Users, Operators and Monitors of storage areas (FIG. 6), storage pools (FIG. 7) and storage groups (FIG. 8). The Monitors are limited to GET commands (as well as a few others) and Operators are authorized to use LIST commands (as well as GET commands). The higher level (storage area) Super Users are authorized to use CREATE/DELETE and SET/CLEAR commands (as well as GET and LIST) while the commands available to lower level (storage group) Super Users are more limited. Similarly, the storage area Operators and Monitors have more commands available than the storage pool Operators and Monitors who, in turn, have more commands available than the storage group Operators and Monitors. More specifically, the storage group Super User may create, delete and set host connections; the storage pool Super User may create, delete and set host connections and create and delete storage groups; and the storage area Super User may create, delete and set host connections and create and delete storage pools.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A data storage management system attached to a data processing network having at least one host device and at least one storage volume, comprising:

a resource allocation table designating a plurality of storage tiers, each tier having at least one partition, the storage tiers including a lowest level storage tier, wherein at least one host device and at least one storage volume is associated with each partition;

an application table associating at least one application with each partition of the lowest level storage tier;

a user profile table identifying:

a Storage Master and associated user profile information;

a Super User for each tier and associated user profile information;

at least one Operator for each partition and associated user profile information;

the user profile information including:

a log-on code;

at least one IP address range which the user is authorized to access; and at least one authorized command selected from a list of available commands;

a user interface for receiving a log-on code and a requested operation input by a user; and a verification system responsive to the received log-on code and requested operation, operable to:

restrict the user to the at least one authorized IP address range; and restrict the user to authorized commands.

2. The data storage management system of claim 1, the user profile table further identifying at least one Monitor and associated profile information for at least one of the at least one partition.

3. The data storage management system of claim 1, wherein:

the plurality of storage tiers numbers three;

the partitions in the lowest level storage tier are storage groups;

the partitions in a middle level storage tier are storage pools; and the partitions in a middle level storage tier are storage areas.

4. The data storage management system of claim 3, wherein the list of commands comprises:
 a list of Super User commands comprising:
  a list of storage area Super User commands;
  a list of storage pool Super User commands; and
  a list of storage group Super User commands; and
 a list of Operator commands comprising:
  a list of storage area Operator commands;
  a list of storage pool Operator commands; and
  a list of storage group Operator commands.

5. The data storage management system of claim 1, wherein the user profile database further includes for selected users a time-out value designating a period of user inactivity after which the verification system must receive another log-on by the user.

6. A data storage management system attached to a data processing network having at least one host device and a plurality of storage volumes, comprising:
 a resource allocation table designating:
  at least one storage area, at least one host device associated with each storage area and at least one storage volume associated with each storage area;
  at least one storage pool in each storage area, at least one storage volume associated with each storage pool and at least one host device associated with each storage pool; and
  at least one storage group in each storage pool, at least one host device associated with each storage group and at least one storage volume associated with each storage group;
 an application table associating at least one application with each storage group;
 a user profile database identifying:
  a Storage Master and an associated log-on code;
  a storage area Super User and an associated log-on code;
  a storage area Operator and an associated log-on code;
  a storage pool Super User and an associated log-on code;
  a storage pool Operator and an associated log-on code;
  a storage group Super User and an associated log-on code;
  a storage group Operator and an associated log-on code;
  for each Super User:
   at least one IP address range which the Super User is authorized to access; and
   at least one authorized command selected from a list of Super User commands; and
  for each Operator:
   at least one IP address range which the Operator is authorized to access; and
   at least one authorized command selected from a list of Operator commands;
 a user interface for receiving a log-on code and a requested operation input by a user; and
 a verification system responsive to the received log-on code and requested operation, the verification system operable to:
  restrict the user to authorized IP address ranges; and
  restrict the user to authorized commands.

7. The data storage management system of claim 6, wherein:
 the list of Super User commands comprises:
  a list of storage area Super User commands;
  a list of storage pool Super User commands; and
  a list of storage group Super User commands; and
 the list of Operator commands comprises:
  a list of storage area Operator commands;
  a list of storage pool Operator commands; and
  a list of storage group Operator commands.

8. The data storage management system of claim 7, wherein:
 the user profile database further identifies:
  at least one storage area Monitor and an associated log-on code;
  at least one storage pool Monitor and an associated log-on code; and
  at least one storage group Monitor and an associated log-on code;
 the user profile database further identifies for each Monitor:
  at least one IP address range which the Monitor is authorized to access; and
  at least one authorized command selected from a list of Monitor commands; and
 the list of Monitor commands comprises:
  a list of storage area Monitor commands;
  an list of storage pool Monitor commands; and
  a list of storage group Monitor commands.

9. The data storage management system of claim 6, wherein:
 the user profile database further identifies:
  at least one storage area Monitor and an associated log-on code;
  at least one storage pool Monitor and an associated log-on code; and
  at least one storage group Monitor and an associated log-on code; and
 the user profile database further identifies for each Monitor:
  at least one IP address range which the Monitor is authorized to access; and
  at least one authorized command selected from the list of Monitor commands.

10. The data storage management system of claim 9, wherein the list of Monitor commands comprises:
 a list of storage area Monitor commands;
 a list of storage pool Monitor commands; and
 a list of storage group Monitor commands.

11. The data storage management system of claim 6, wherein the user profile database further identifies for selected users a time-out value designating a period of user inactivity after which the verification system must receive another log-on by the user.

12. The data storage management system of claim 6, wherein the user profile database further identifies selected users who may access the data only one time.

13. The data storage management system of claim 6, wherein the user profile database further identifies selected users who may access the data only if the verification system receives a log-on code from a second user.

14. The data storage management system of claim 6, wherein:
 the user profile database further identifies a plurality of Storage Master commands permitted to the storage master, comprising:
  INSERT VOLUME;
  SET VOLUME;
  CREATE STORAGE AREA;
  DELETE STORAGE AREA;
  CREATE STORAGE POOL;
  DELETE STORAGE POOL;

CREATE STORAGE GROUP; and
DELETE STORAGE GROUP;
the list of storage area Super User commands comprises:
CREATE STORAGE POOL; and
DELETE STORAGE POOL; and
the list of storage pool Super User commands comprises:
CREATE STORAGE GROUP; and
DELETE STORAGE GROUP.

15. A management server attached to a storage network, the storage network having at least one host device, at least one storage server, a plurality of storage volumes and at least one user console, the management server comprising:
   a memory unit storing a resource allocation table and a user profile database;
   a Storage Master interface, coupled to the memory unit, operable to receive first database entries from a Storage Master, the first database entries comprising;
      a definition of at least one storage area, to be stored in the resource allocation table, designating at least one host device and at least one storage volume to each storage area; and
      a first user profile, to be stored in the user profile database, identifying a storage area Super User, an associated log-on code, at least one IP address range which the storage area Super User is authorized to access, and at least one authorized command selected from a list of Super User commands;
   a storage area Super User interface, coupled to the memory unit, operable to receive second database entries from a storage area Super User, the second database entries comprising;
      a definition of at least one storage pool, to be stored in the resource allocation table, designating at least one host device and at least one storage volume to each storage pool;
      a second user profile, to be stored in the user profile database, identifying a storage pool Super User, an associated log-on code, at least one P address range which the storage pool Super User is authorized to access, and at least one authorized command selected from a list of Super User commands; and
      a third user profile, to be stored in the user profile database, identifying at least one storage area Operator, an associated log-on code, at least one IP address range which the storage area Operator is authorized to access, and at least one authorized command selected from a list of Operator commands;
   a storage pool Super User interface, coupled to the memory unit, operable to receive third database entries from a storage pool Super User, the third database entries comprising;
      a definition of at least one storage group, to be stored in the resource allocation table, designating at least one host device and at least one storage volume to each storage group;
      a fourth user profile, to be stored in the user profile database, identifying a storage group Super User, an associated log-on code, at least one IP address range which the storage group Super User is authorized to access, and at least one authorized command selected from a list of Super User commands; and
      a fifth user profile, to be stored in the user profile database, identifying at least one storage pool Operator, an associated log-on code, at least one IP address range which the storage pool Operator is authorized to access, and at least one authorized command selected from a list of Operator commands;
   a storage group Super User interface, coupled to the memory unit, operable to receive fourth database entries from a storage group Super User, the fourth database entries comprising;
      a sixth user profile, to be stored in the user profile database, identifying at least one storage group Operator, an associated log-on code, at least one IP address range which the storage group Operator is authorized to access, and at least one authorized command selected from a list of Operator commands;
   a user interface, interconnected with the user console, for receiving a log-on code and a requested operation input by a user; and
   a processing unit responsive to the received log-on code and requested operation, the processing unit operable to:
      restrict the user to authorized IP address ranges; and
      restrict the user to authorized commands.

16. The management server of claim 15, wherein:
   the second database entries further comprise a seventh user profile, to be stored in the user profile database, identifying at least one storage area Monitor, an associated log-on code, at least one IP address range which the storage area Monitor is authorized to access, and at least one authorized command selected from a list of Monitor commands;
   the third database entries further comprise an eighth user profile, to be stored in the user profile database, identifying at least one storage pool Monitor, an associated log-on code, at least one IP address range which the storage pool Monitor is authorized to access, and at least one authorized command selected from a list of Monitor commands; and
   the fourth database entries further comprise a ninth user profile, to be stored in the user profile database, identifying at least one storage group Monitor, an associated log-on code, at least one IP address range which the storage group Monitor is authorized to access, and at least one authorized command selected from a list of Monitor commands.

17. The management server of claim 15, wherein user profile database entries further designate for selected users a time-out value designating a period of user inactivity after which the processing unit must receive another log-on by the user.

18. The management server of claim 15, wherein user profile database entries further designate selected users who may access the data only one time.

19. The management server of claim 15, wherein user profile database entries further designate selected users who may access the data only if the processing unit receives a log-on code from a second user.

20. A computer-readable storage medium tangibly embodying a program of instructions executable by a management server attached to a storage network having a plurality of client computers, at least one host device, at least one storage server and a plurality of storage volumes, the program comprising instructions for:
   in a configuration mode:
      storing in a resource allocation table designations for:
         at least one storage area, at least one host device associated with each storage area and at least one storage volume associated with each storage area;

at least one storage pool in each storage area, at least one storage volume associated with each storage pool and at least one host device associated with each storage pool; and at least one storage group in each storage pool, at least one host device associated with each storage group and at least one storage volume associated with each storage group;

storing in an application table an association of at least one application with each storage group; and storing in a user profile database identifications for:
a Storage Master and an associated log-on code;
a storage area Super User and an associated log-on code;
a storage area Operator and an associated log-on code;
a storage pool Super User and an associated log-on code;
a storage pool Operator and an associated log-on code;
a storage group Super User and an associated log-on code;
a storage group Operator and an associated log-on code;
for each Super User:
at least one IP address range which the Super User is authorized to access; and
at least one authorized command selected from a list of Super User commands; and for each Operator:
at least one IP address range which the Operator is authorized to access; and
at least one authorized command selected from a list of Operator commands; and in an operating mode:
receiving a log-on code and a requested operation input by a user; and
in response to the received log-on code and requested operation:
restricting the user to authorized IP address ranges; and
restricting the user to authorized commands.

21. The computer-readable storage medium of claim 20, the program further comprising instructions for, in the configuration mode, storing in the user profile database identifications for:
at least one storage area Monitor and an associated log-on code, at least one IP address range which the storage area Monitor is authorized to access and at least one authorized command selected from a list of Monitor commands;
at least one storage pool Monitor and an associated log-on code, at least one IP address range which the storage pool Monitor is authorized to access and at least one authorized command selected from the list of Monitor commands; and
at least one storage group Monitor and an associated log-on code, at least one IP address range which the storage group Monitor is authorized to access and at least one authorized command selected from the list of Monitor commands.

22. The computer-readable storage medium of claim 20, the program further comprising instructions for storing in the user profile database a time-out value for selected users designating a period of user inactivity after which the another log-on by the user is required.

23. The computer-readable storage medium of claim 20, the program further comprising instructions for storing in the user profile database the identifies of selected users who may access the data only one time.

24. The computer-readable storage system of claim 20, the program further comprising instructions for storing in the user profile database identifies of selected users who may access the data only if a log-on code from a second user is received.

25. A method for managing a storage network having a management server, a plurality of client computers, at least one host device, at least one storage server and a plurality of storage volumes, the method comprising:

in a configuration mode:
storing in a resource allocation table designations for:
at least one storage area, at least one host device associated with each storage area and at least one storage volume associated with each storage area;
at least one storage pool in each storage area, at least one storage volume associated with each storage pool and at least one host device associated with each storage pool; and
at least one storage group in each storage pool, at least one host device associated with each storage group and at least one storage volume associated with each storage group;
storing in an application table an association of at least one application with each storage group; and
storing in a user profile database identifications for:
a Storage Master and an associated log-on code;
a storage area Super User and an associated log-on code;
a storage area Operator and an associated log-on code;
a storage pool Super User and an associated log-on code;
a storage pool Operator and an associated log-on code;
a storage group Super User and an associated log-on code;
a storage group Operator and an associated log-on code;
for each Super User:
at least one IP address range which the Super User is authorized to access; and
at least one authorized command selected from a list of Super User commands; and
for each Operator:
at least one IP address range which the Operator is authorized to access; and
at least one authorized command selected from a list of Operator commands; and
in an operating mode:
receiving a log-on code and a requested operation input by a user; and
in response to the received log-on code and requested operation:
restricting the user to authorized IP address ranges; and
restricting the user to authorized commands.

26. The method of claim 25, further comprising, in the configuration mode, storing in the user profile database identifications for:
at least one storage area Monitor and an associated log-on code, at least one IP address range which the storage area Monitor is authorized to access and at least one authorized command selected from a list of Monitor commands;

at least one storage pool Monitor and an associated log-on code, at least one IP address range which the storage pool Monitor is authorized to access and at least one authorized command selected from the list of Monitor commands; and at least one storage group Monitor and an associated log-on code, at least one IP address range which the storage group Monitor is authorized to access and at least one authorized command selected from the list of Monitor commands.

27. The method of claim 25, further comprising storing in the user profile database a time-out value for selected users designating a period of user inactivity after which the another log-on by the user is required.

28. The method of claim 25, further comprising instructions for storing in the user profile database the identifies of selected users who may access the data only one time.

29. The method of claim 25, further comprising instructions for storing in the user profile database identifies of selected users who may access the data only if a log-on code from a second user is received.

* * * * *